3,591,332
PROCESS FOR RECOVERY OF SULFUR FROM GYPSUM

D'Arcy R. George and James M. Riley, Salt Lake City, Utah, assignors to the United States of America as represented by the Secretary of the Interior
No Drawing. Filed Aug. 19, 1968, Ser. No. 753,730
Int. Cl. C01d 7/00; C01b 7/16, 11/24
U.S. Cl. 23—64                                    1 Claim

ABSTRACT OF THE DISCLOSURE

Sulfur is produced from gypsum by (1) roasting the gypsum with carbon or a reducing gas to form CaS; (2) reacting the CaS with $H_2S$ and water to produce a solution of $Ca(HS)_2$; (3) converting the $Ca(HS)_2$ to NaHS by ion exchange; (4) carbonating the NaHS solution to form $H_2S$ and $NaHCO_3$; (5) decomposing $H_2S$ and $NaHCO_3$ to produce sulfur and $Na_2CO_3$, respectively.

---

This invention, which relates to the recovery of sulfur or production of sulfuric acid from gypsum, resulted from work done by the Bureau of Mines in the U.S. Department of the Interior, and domestic title to the invention is in the Government.

This country is facing a shortage of sulfur from traditional sources. For this reason, much research has gone into recovering sulfur from new sources, such as gypsum. However, as the sulfur (or sulfuric acid) and by-products produced from gypsum by methods heretofore employed have been insufficient to defray production costs, sulfur has not been commercially produced therefrom in this country.

We have now discovered a process for economically recovering sulfur or producing sulfuric acid from gypsum. Basically, the process comprises:

(a) reacting $CaSO_4$ with a reducing agent such as C, CO, or $H_2$ to form CaS;
(b) mixing the CaS with water, and contacting the mixture with $H_2S$ to form a solution of $Ca(HS)_2$;
(c) subjecting the $Ca(HS)_2$ solution to ion exchange with sodium ion to form a solution of NaHS;
(d) contacting the NaHS solution with $CO_2$ to form $NaHCO_3$ and $H_2S$; and
(e) treating the $H_2S$ by known methods to form S and/or $H_2SO_4$.

During ion exchange, sodium chloride is usually employed in the circuit whereby $CaCl_2$ is also formed, which in combination with $Na_2CO_3$ (formed by heating the $NaHCO_3$) constitute valuable by-products. Theoretical yields from such an overall process are 372 pounds S (or 1140 pounds $H_2SO_4$), 1232 pounds $Na_2CO_3$, and 1290 pounds $CaCl_2$ per ton of gypsum. Feed material requirements (besides water) are basically limited to 1360 pounds NaCl and 280 pounds carbon per ton of gypsum.

The following diagram schematically illustrates the process:

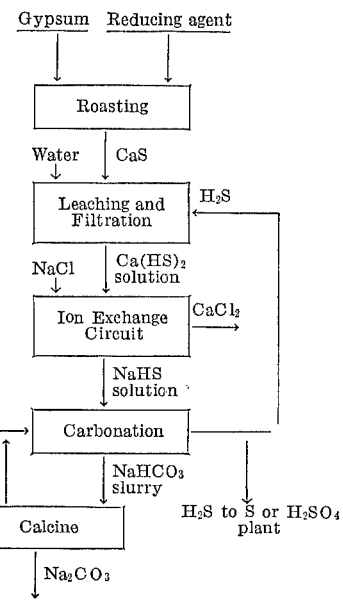

If carbon is employed as reducing agent in the roasting step, the process can be generally modified as follows:

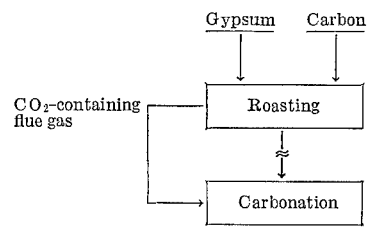

It is therefore an object of this invention to produce sulfur from gypsum through the use of ion exchange resins. A further object is to produce, along with sulfur, substantial amounts of $CaCl_2$ and $Na_2CO_3$. A further object is to provide a process for producing sulfur from gypsum wherein coal or natural gas, water, and NaCl are the only other externally-supplied reactants. Other object and advantages will be obvious from the following more detailed description of the invention.

In the practice of the invention, gypsum ($CaSO_4 \cdot 2H_2O$) or anhydrite ($CaSO_4$) is reduced to CaS in a roasting furnace generally as follows:

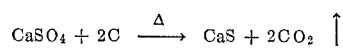

or

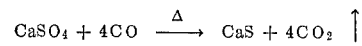

or

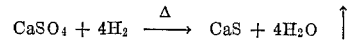

As the source of the reducing agent, coal or a variety of carbon- or hydrogen-containing materials such as coke, lignite, reformed natural gas, producer gas, oil, or mixtures thereof is employed. Maximum conversion of $CaSO_4$ to CaS is obtained over a temperature range of about 800° C. to about 1,000° C. and a reaction time range of about 20 to 120 minutes.

CaS product from the roasting step is cooled and ground. It is then mixed with water and contacted with gaseous $H_2S$ whereby a $Ca(HS)_2$ solution is formed in accordance with the following well known reaction:

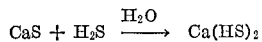
$$CaS + H_2S \xrightarrow{H_2O} Ca(HS)_2$$

This reaction proceeds readily and may be accomplished with near stoichiometric use of $H_2S$ if the water slurry of CaS is contacted with $H_2S$ in contactors designed to provide continuous countercurrent flow of the slurry and $H_2S$. The reaction is exothermic and provision should be made to remove the heat of reaction, as for example, by means of cooling coils. To facilitate subsequent production of $Na_2CO_3$, the volume of water used to prepare the CaS slurry should be such as to yield a $Ca(HS)_2$ solution containing between about 100 and about 160 grams of $Ca(HS)_2$ per liter, i.e., approximately 2 N to 3 N.

After the reaction of CaS with water and $H_2S$ is completed, the $Ca(HS)_2$ solution is separated from the insoluble residue by settling and filtration. The clarified solution then is contacted with a cation exchange resin in the sodium form and the resin is subsequently regenerated with NaCl solution. Preferred resins are the strongly acid nuclear sulfonic types which are crosslinked polystyrenes with sulfonic acid groups. Examples are Dowex 50, Amberlite IR–120 and 200, Nalcite HCR, Duolite C–20 and C–25, and Lewatit S–100. The resins heretofore described have an exchange capacity of about 2 to 2.3 equivalents per liter which corresponds to a loading capacity of about 2.5 to 2.9 pounds of calcium or 2.9 to 3.3 pounds of sodium per cubic foot of resin.

Contacting of the resin with $Ca(HS)_2$ or NaCl solutions is accomplished by any of the conventional ion exchange techniques, but because it is desirable to contact the resin with solutions containing between 2 and 3 equivalents of $Ca(HS)_2$ or NaCl per liter (so as to facilitate subsequent recovery of $Na_2CO_3$ and $CaCl_2$), it is preferable to use a packed bed type ion exchange contactor in which both the resin and solution move continuously or substantially continuously and countercurrently.

The reaction during contact of the $Ca(HS)_2$ solution with the cation exchange resin is as follows:

$$Ca(HS)_2 + 2NaR \rightleftharpoons CaR_2 + 2NaHS$$

("R" denotes the ion exchange resin.) Thereafter the calcium form of the resin, after washing with water, is contacted with a concentrated solution of NaCl to reconvert the resin to the sodium form in accordance with the following reaction:

$$CaR_2 + 2NaCl \rightleftharpoons 2NaR + CaCl_2$$

For both ion exchange operations, temperatures of about 20° C. to about 70° C. are suitable.

Alternative ion exchange techniques can be employed to convert $Ca(HS)_2$ to NaHS. That is, the $Ca(HS)_2$ solution can be contacted with the chloride form of a strong base anion exchanger such as Amberlite IRA–400, Dowex 1 or 21K, etc., whereby the following reaction occurs:

$$2RCl + Ca(HS)_2 \rightleftharpoons 2RHS + CaCl_2$$

Production of NaHS and reconversion of the resin to the chloride form then is brought about as follows:

$$2RHS + 2NaCl \rightleftharpoons 2NaHS + 2RCl$$

Due to the lower exchange capacity of anion exchange resins, higher cost, and other considerations, the use of cation exchange resins is preferred.

In the reactions employing cation exchange resins under optimum countercurrent flow conditions (utilizing a 2 to 3 N $Ca(HS)_2$ solution), the effluent NaHS solution will contain between 2 and 3 equivalents of NaHS per liter and only very small amounts of $Ca(HS)_2$. That is, conversion of the resin from the sodium to calcium form is accomplished with a near stoichiometric quantity of $Ca(HS)_2$. The subsequent displacement of calcium by sodium utilizing a solution of NaCl proceeds less readily and the effluent $CaCl_2$ solution may contain appreciable amounts of NaCl. This excess NaCl can be recovered during evaporation to recover solid $CaCl_2$. Alternatively, in areas where gypsum is not readily available, the $CaCl_2$ solution can be used to produce gypsum by reacting the $CaCl_2$ solution with sulfate-bearing brines or bitterns such as oil field brines, sea water bitterns, or other natural brines or bitterns (e.g., those from the Great Salt Lake).

As mentioned previously, the NaHS solution produced by ion exchange usually contain small amounts of calcium which should preferably be removed prior to subsequent processing (for reasons explained hereinafter). Removal of calcium can be accomplished by addition of stoichiometric quantities of $Na_2CO_3$ to precipitate calcium as $CaCO_3$ in accordance with the following well known reaction:

$$Ca(HS)_2 + Na_2CO_3 \rightarrow CaCO_3 + 2NaHS$$

The purified solution of NaHS is then treated with carbon dioxide, a portion of which can be provided by the flue gas from the initial roasting step (if carbon was employed therein). The carbonation reaction proceeds as follows:

$$NaHS + CO_2 + H_2O \rightarrow NaHCO_3 + H_2S\uparrow$$

Reaction temperatures in the range of about 10° C. to about 30° C. are suitable. If the NaHS is not first purified to remove calcium, then the $NaHCO_3$ will be contaminated with $CaCO_3$ and/or $CaHCO_3$.

Half of the $H_2S$ evolved by carbonation is recycled to the $Ca(HS)_2$ production step while the remainder is treated by well known means, such as the Claus Chance process to produce sulfur as follows:

$$2H_2S + O_2 \rightarrow 2S + 2H_2O$$

Alternatively, the $H_2S$ can be burned with sufficient oxygen (air) to produce $SO_2$ which then can be converted to sulfuric acid.

Depending upon the initial concentration of NaHS solution prior to gassing with $CO_2$, a portion of the $NaHCO_3$ formed during carbonation is precipitated and the remainder is in solution. For example, starting with a 3 N NaHS solution, about two-thirds of the $NaHCO_3$ will precipitate at 20° C. and can be recovered by filtration. The remainder is recovered by evaporation or other suitable means. At other NaHS concentrations, varying proportions of the $NaHCO_3$ will precipitate.

In the final step of the process, $NaHCO_3$ is converted to $Na_2CO_3$ by calcination at about 200–300° C. as per the following reaction:

$$2NaHCO_3 \xrightarrow{\Delta} Na_2CO_3 + H_2O\uparrow + CO_2\uparrow$$

The wet offgas from this step is condensed to remove water and the essentially pure $CO_2$ can be recycled to the NaHS carbonation step.

The following tests illustrate the effectiveness of the individual steps in the process of the present invention.

ROASTING

Test 1

Finely ground gypsum containing at least 98 percent $CaSO_4 \cdot 2H_2O$ was mixed with finely ground coke and coal in the ratio of 2.2 moles of carbon per mole of gypsum. This is equivalent to 15.3 percent carbon by weight. The mixtures were then continuously fed into an electrically heated rotating tube furnace wherein, depending on the feed rate, the residence time of the charge ranged from 20 to 30 minutes. The temperature was 950° C. Conversion of $CaSO_4$ to CaS ranged from 95 to 98 percent and the calcines contained approximately 90 percent CaS. The principal impurity was unconsumed carbon and unreacted $CaSO_4$. Under the above roasting conditions the atmosphere in the tube furnace is essentially one of CO and $CO_2$, but in corollary experiments it was found that the presence of nitrogen or oxygen, the latter in concentrations up to perhaps 3 percent, have no significant effect on the reduction efficiency.

Test 2

Reduction was accomplished with reformed natural gas in fluidized-bed reactors. In experiments with a 2.5-inch-diameter externally heated reactor, 300-gram charges of minus 65 plus 200 mesh dehydrated gypsum were roasted for 1 hour at 950° C. using a 100 percent excess of reformed natural gas (reforming efficiency 90 percent) as the fluidizing medium. Analyses of the calcines showed conversion efficiencies of $CaSO_4$ to CaS up to 99 percent.

PRODUCTION OF $Ca(HS)_2$

Test 3

In continuous leaching tests CaS (92 percent) was leached in the ratio of 117 grams of CaS per liter of water utilizing 5 percent excess $H_2S$. Dissolution of CaS to form $Ca(HS)_2$ was in exces of 98 percent in 100 minutes.

ION EXCHANGE

Test 4

A 1 N solution of $Ca(HS)_2$ was passed at a rate of 4 ml./minute (20 minutes retention time) through a 200 ml.-volume bed of the sodium form of a strongly acid cation exchange resin, in a glass column. The first 200 ml. (1 bed volume) of effluent, after displacement of the initial void volume of water contained in the bed, was a 1 N solution of NaHS completely free of calcium. Thus, it is evident that a continuous countercurrent contact system would allow continuous production of a NaHS solution substantially free of calcium.

Test 5

A glass, continuous countercurrent ion exchange column 2 inches in diameter by approximately 10 feet long was assembled and filled with approximately 5.5 liters of a strongly acid cation exchange resin. The column contained provisions for continuously feeding resin in the sodium form at the top and for withdrawing resin in the calcium form at the base while at the same time introducing the $Ca(HS)_2$ input solution at the base and overflowing the effluent NaHS solution at the top.

When using a 3 N $Ca(HS)_2$ feed solution at a ratio of 0.67 liter per liter of resin and a resin flow of 50 ml./minute, equivalent to resin retention time of about 110 minutes, the effluent solution was a NaHS solution containing less than 0.01 gram Ca per liter.

Test 6

The resin in the glass column of Test 4 (which resin was essentially in the calcium form after having 400 ml. of $Ca(HS)_2$ solution passed therethrough) was regenerated to the sodium form with a saturated solution of NaCl. At a solution flow of 8 ml./minute, equivalent to a solution retention time of 10 minutes, a peak effluent concentration of 47 grams of calcium per liter, equivalent to 132 grams of $CaCl_2$ per liter, was achieved.

Test 7

Utilizing the countercurrent ion exchange column described in Test 5, resin loaded to 42 grams of calcium and 2.8 grams of sodium per liter was regenerated under countercurrent flow conditions with a 64-percent excess of a 4.1 N NaCl solution at a resin retention time of 200 minutes. The effluent from the column contained 62 grams of calcium and 23 grams of sodium per liter, which represents 3.1 equivalents of $CaCl_2$ and 1 equivalent of NaCl per liter.

PRODUCTION OF $NaHCO_3$ AND $H_2S$

Test 8

A 2 N NaHS solution produced by ion exchange was contacted countercurrently in a four-stage gas absorption column with a simulated flue gas containing 20 percent $CO_2$–80 percent $N_2$ to produce sodium bicarbonate and hydrogen sulfide. Using a 10-percent excess of gas and a solution retention time of 105 minutes, 94.6 percent of the NaHS was converted to $NaHCO_3$. About half of this amount precipitated during the carbonation at 30° C.

Test 9

Utilizing 3 N NaHS solutions saturated with NaCl, up to 92 percent of the $NaHCO_3$ precipitated during carbonation at 20° C. and was recovered by filtration.

PRODUCTION OF $Na_2CO_3$

Test 10

$NaHCO_3$ produced from purified NaHS-NaCl solution was washed with cold, saturated $NaHCO_3$ solution and calcined at about 300° C. The resulting $Na_2CO_3$ contained less than 0.01 percent $S^-$ and less than 0.02 percent total sulfur. Offgas from the thermal decomposition of $NaHCO_3$ is a mixture of $CO_2$ and water vapor. If desired, the water vapor could have been condensed to recover pure $CO_2$ gas for recycle to the carbonation step.

The process of the present invention can be employed to recover sulfur from (1) natural gypsum or anhydrite; (2) gypsum residues resulting from chemical processes as, for example, gypsum residues from the production of wet process phosphoric acid, and gypsum residues resulting from the removal of $SO_2$ from stack gases by scrubbing said gases with milk of lime; and (3) gypsum resulting from removal of sulfate from natural brines by precipitating with calcium chloride. As such, the invention could conserve the Nation's sulfur resources in that it can make economically available the almost unlimited quantities of sulfur that occur in gypsum deposits and natural brines in various parts of our country. Further, the invention could alleviate problems associated with the disposal of gypsum residues resulting from chemical processes.

While the process is well adapted to carry out the objects of the present invention, it is to be understood that various modifications and changes may be made all coming within the scope of the following claim.

What is claimed is:
1. A process for producing $CaCl_2$, $H_2S$ and $NaHCO_3$ comprising
  (a) reducing $CaSO_4$ with a reducing agent selected from the group consisting of C, CO, and $H_2$ to produce CaS;
  (b) contacting said CaS, in the presence of water, with $H_2S$ to produce a solution of $Ca(HS)_2$;
  (c) contacting said $Ca(HS)_2$ solution with the sodium form of a cation exchange resin to produce NaHS solution and to produce the calcium form of said ion exchange resin, and eluting said calcium form of said resin with a concentrated solution of NaCl to reconvert said resin to its sodium form and to produce $CaCl_2$ solution; and
  (d) contacting said NaHS solution with $CO_2$ to produce $H_2S$ and $NaHCO_3$.

(References on following page)

References Cited

UNITED STATES PATENTS

| | | | |
|---|---|---|---|
| 1,722,170 | 7/1929 | Bassett | 23—134 |
| 3,378,336 | 4/1968 | George et al. | 23—134X |
| 2,771,418 | 11/1956 | Zeegers | 23—50X |

FOREIGN PATENTS

| | | | |
|---|---|---|---|
| 11,296 | 5/1891 | Great Britain | 23—64 |

OTHER REFERENCES

Mellor: Comprehensive Treatise on Inorganic and Theoretical Chemistry, vol. 3, Longmans, Green and Co., New York, 1923, pp. 741 and 742.

MILTON WEISSMAN, Primary Examiner

U.S. Cl. X.R.

23—90, 181